US012673581B2

(12) United States Patent
Zomorodi Moghadam et al.

(10) Patent No.: US 12,673,581 B2
(45) Date of Patent: Jul. 7, 2026

(54) VEHICLE BATTERY CELL BALANCING

(71) Applicant: FORD GLOBAL TECHNOLOGIES, LLC, Dearborn, MI (US)

(72) Inventors: Hesam Zomorodi Moghadam, Ypsilanti, MI (US); Xu Wang, Northville, MI (US); Rui Wang, Irvine, CA (US); Andrea Cordoba Arenas, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1084 days.

(21) Appl. No.: 17/578,880

(22) Filed: Jan. 19, 2022

(65) Prior Publication Data

US 2023/0226950 A1    Jul. 20, 2023

(51) Int. Cl.
| | |
|---|---|
| *B60L 58/22* | (2019.01) |
| *B60L 50/60* | (2019.01) |
| *B60L 58/13* | (2019.01) |
| *H02J 7/34* | (2006.01) |
| *H02J 7/54* | (2026.01) |
| *H02J 7/82* | (2026.01) |

(52) U.S. Cl.
CPC ............... *B60L 58/22* (2019.02); *B60L 50/60* (2019.02); *B60L 58/13* (2019.02); *H02J 7/342* (2020.01); *H02J 7/54* (2026.01); *H02J 7/82* (2026.01)

(58) Field of Classification Search
CPC .................................. B60L 58/22; B60L 58/13
USPC ......................................................... 320/136
See application file for complete search history.

(56) References Cited

U.S. PATENT DOCUMENTS

| | | | |
|---|---|---|---|
| 8,710,800 B2 | 4/2014 | Gibbs et al. | |
| 9,148,028 B2 | 9/2015 | Suzuki et al. | |
| 9,840,161 B2 | 12/2017 | Chikkannanavar et al. | |
| 2017/0141590 A1 | 5/2017 | Tofigh et al. | |
| 2022/0285949 A1* | 9/2022 | Kuranuki | .............. H02J 7/0048 |
| 2023/0344248 A1* | 10/2023 | Park | ...................... H02J 7/0019 |

* cited by examiner

*Primary Examiner* — Nathaniel R Pelton
(74) *Attorney, Agent, or Firm* — David B. Kelley; Brooks Kushman P.C.

(57) ABSTRACT
A controller initiates discharging of at least some cells of a traction battery based on data indicative of cell state of charge and cell capacity such that, upon completion of the discharging, states of charge of at least some of the cells are different, and after charging the cells with a same current for a same period of time, the states of charge fall with a predefined range of values.

14 Claims, 3 Drawing Sheets

VEHICLE BATTERY CELL BALANCING

TECHNICAL FIELD

The present disclosure relates to a system for balancing battery cells on an electric vehicle.

BACKGROUND

A traction battery on an electric vehicle may include a plurality of battery cells. Due to the operating condition difference (e.g. temperature) and/or cell replacements, the capacity of the cells may be significantly different from each other.

SUMMARY

A power system for a vehicle has a traction battery including a plurality of series connected cells, and a controller. The controller initiates discharging of at least some of the cells based on data indicative of cell state of charge and cell capacity such that, upon completion of the discharging, states of charge of at least some of the cells are different, and after charging the cells with a same current for a same period of time, the states of charge fall with a predefined range of values.

A vehicle has an electric motor, a traction battery that supplies power to the electric motor and includes a plurality of cells, and a controller. The controller, responsive to detecting a difference between a used charge of one of the cells being greater than a starting threshold, performs a charge balancing on the one of the cells, and responsive to detecting the difference being less than a stopping threshold, stops the charge balancing.

A method includes discharging at least some cells of a traction battery based on data indicative of cell state of charge and cell capacity such that, upon completion of the discharging, states of charge of at least some of the cells are different, and following the discharging, charging the cells for a same period of time such that at an end of the period of time, the states of charge fall with a predefined range of values.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for balancing the electric charge between a plurality of battery cells.

Figure 1:
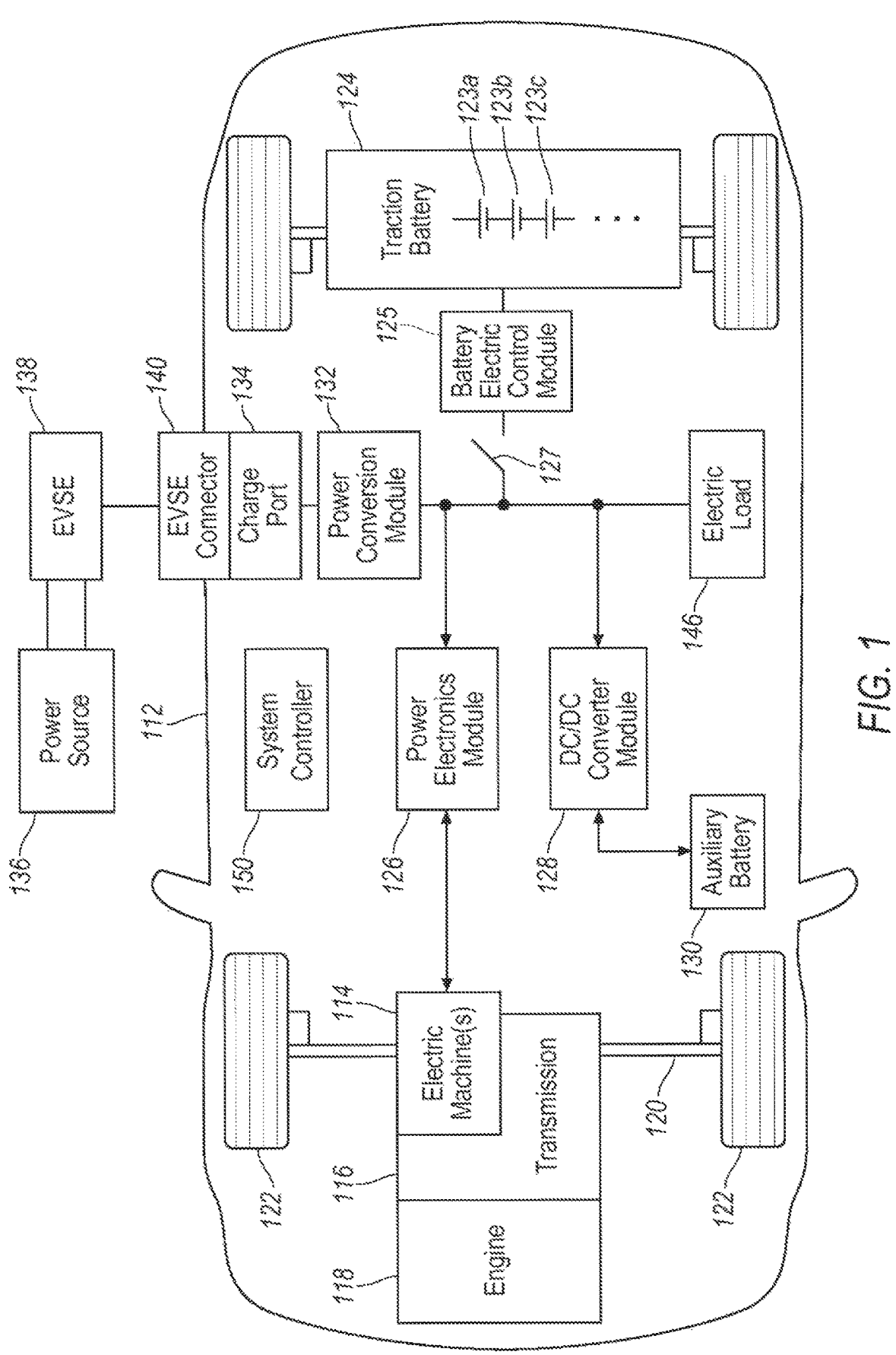
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may include one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and slowing capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. A vehicle battery pack 124 may include a plurality of battery cells 123 connected in series to provide a high voltage DC output. In one example, the battery cells 123 may be permanently fixed to a housing of the traction battery 124 and not removable. In an alternative example, the battery cells 123 may be individually removable to allow the user to replace one or more aged cells such that the general life of the traction battery 124 may be prolonged. It is noted that the term battery cell is used as a general term in the present disclosure and may refer to a single battery cell, an array of battery cells connected in series or the like. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more electrical loads 146 may be coupled to the high-voltage bus. The electrical loads 146 may have an associated controller that operates and controls the electrical loads 146 when appropriate. Examples of electrical loads 146 may be a heating module, an air-conditioning module, or the like.

The various components discussed may have one or more associated controllers to control and monitor the operation of the components. The controllers may communicate via a serial bus (e.g., Controller Area Network (CAN)) or via discrete conductors. A system controller 150 may be present to coordinate the operation of the various components. It is noted that the system controller 150 is used as a general term and may include one or more controller devices configured to perform various operations in the present disclosure. For instance, the system controller 150 may be programmed to enable a powertrain control function to operate the powertrain of the vehicle 112. The system controller 150 may be further programmed to enable a telecommunication function with various entities (e.g. a server) via a wireless network (e.g. a cellular network).

Figure 2:
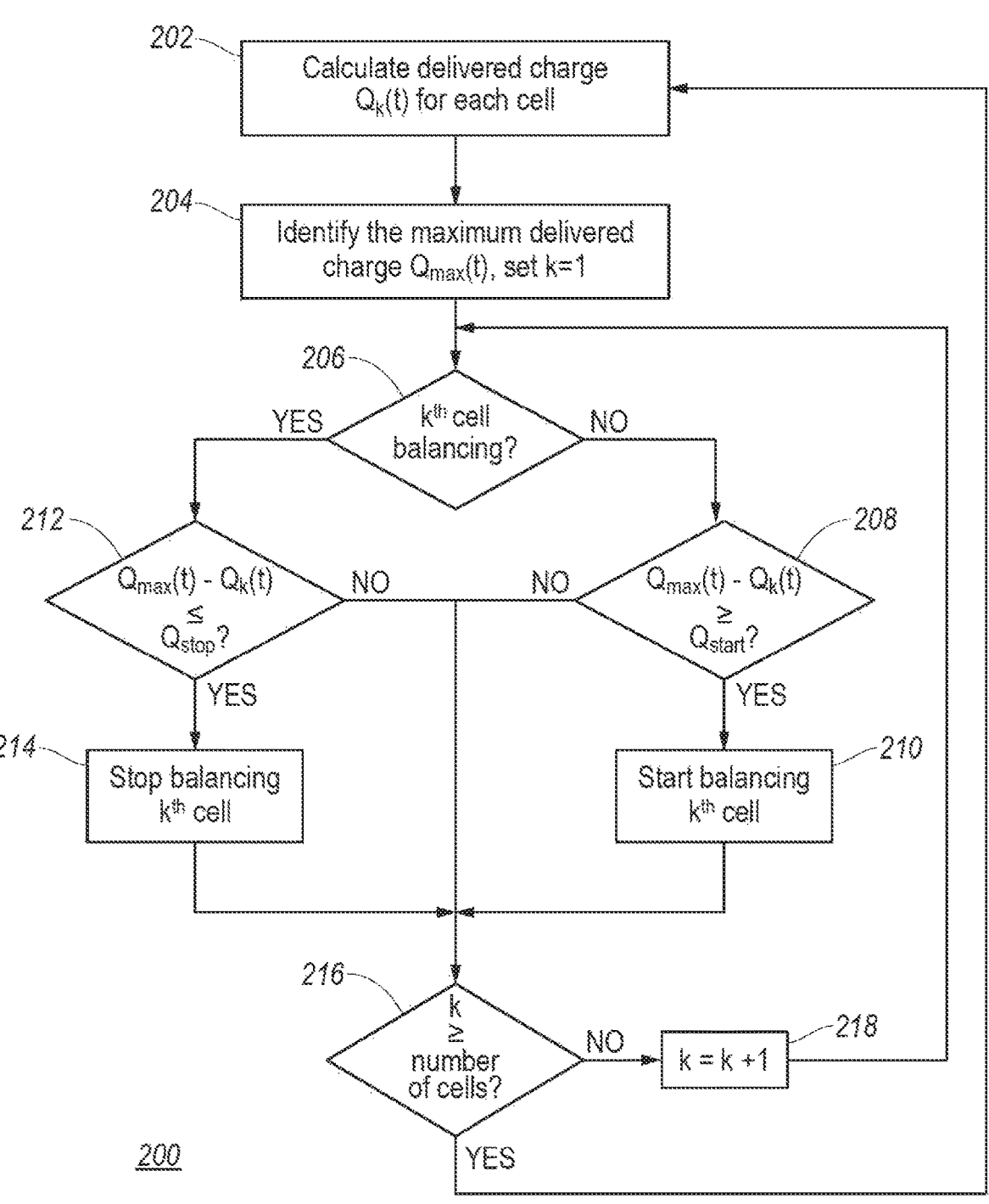
FIG. 2 illustrates an example flow diagram of a battery cell balancing process.

Referring to FIG. 2, a flow diagram of a battery cell balancing process 200 is illustrated. With continuing reference to FIG. 1, operations of the process 200 may be implemented via the BECM 125 and/or the system controller 150 individually or collectively. For simplicity purposes, the following description will be made with reference to BECM 125. At operation 202, the BECM 125 calculates a delivered charge (used charge) $Q_k(t)$ of each cell of the battery pack 124 at a current time. The delivered charge $Q_k(t)$ may refer to the electric charge that has already been used/discharged from each cell as represented by equation (1) below:

$$Q_k(t) = (SOC_{max} - SOC_k(t)) \times CAP_k \qquad (1)$$

$SOC_{max}$ denotes a maximum state of charge (SOC) when the cell is fully charged (e.g. 100%). $SOC_k(t)$ denotes the current SOC of the cell at the current time t. $CAP_k$ denotes the full capacity of the cell. In the present example, if the traction battery 124 includes k cells, the delivered charge $Q_k(t)$ of each of the k cells will be calculated individually. At operation 204, the BECM 125 compares the delivered charge $Q_k(t)$ of each cell 123 to identify the maximum delivered charge $Q_{max}(t)$ at the current time and uses the maximum delivered charge $Q_{max}(t)$ as a reference. The BECM 125 sets k=1 to start the cell balancing operation. At operation 206, responsive to detecting the kth cell (i.e. the first cell in the present example) is not being currently balanced, the process proceeds to operation 208 and the BECM 125 determines if the difference between the maximum delivered charge $Q_{max}(t)$ and the delivered charge $Q_k(t)$ of the kth cell is greater than a starting threshold $Q_{start}$ (e.g. 2 Ah). If the answer is yes indicative of the current delivered charge $Q_k(t)$ is significantly less than the maximum delivered charge $Q_{max}(t)$ as a reference, the process proceeds to operation 210 to balance the kth cell. There are a variety of methods to balance the charge of a battery cell 123. For instance, the BECM 125 may perform a passive balancing to the kth cell by directly discharging the kth cell without transferring the charge to any other cells. Alternatively, the BECM 125 may perform an active balancing by transferring the charge from the kth cell to one or more other cells (e.g. the cell having the maximum delivered charge $Q_{max}(t)$). As the kth cell is being balanced (i.e. discharged), the delivered charge $Q_k(t)$ increases. Therefore, the difference between the maximum delivered charge $Q_{max}(t)$ and the delivered charge $Q_k(t)$ of the kth cell decreases.

If the answer for operation 206 is yes indicative of the kth cell being balanced, the process proceeds to operation 212 and the BECM determines if the difference between the maximum delivered charge $Q_{max}(t)$ and the delivered charge $Q_k(t)$ of the kth cell has reduced below a stopping threshold $Q_{stop}$ (e.g. 1 Ah). As an example, the stopping threshold $Q_{stop}$ may be less than the starting threshold $Q_{start}$. If the answer is yes, the process proceeds to operation 214 and the BECM 125 stops the balancing for the kth cell. At operation 216, the BECM 125 verifies if all cells have been balanced. If the answer is no, the BECM 125 sets k=k+1 and performs the balancing for the next cell. It is noted that although the multiple cells 123 are balanced sequentially with reference to FIG. 2, the present disclosure is not limited thereto and the battery cells 123 may be balanced at a same time. If all battery cells 123 have been balanced, the process may return to operation 202 to perform a next cycle of balancing process.

Figure 3:
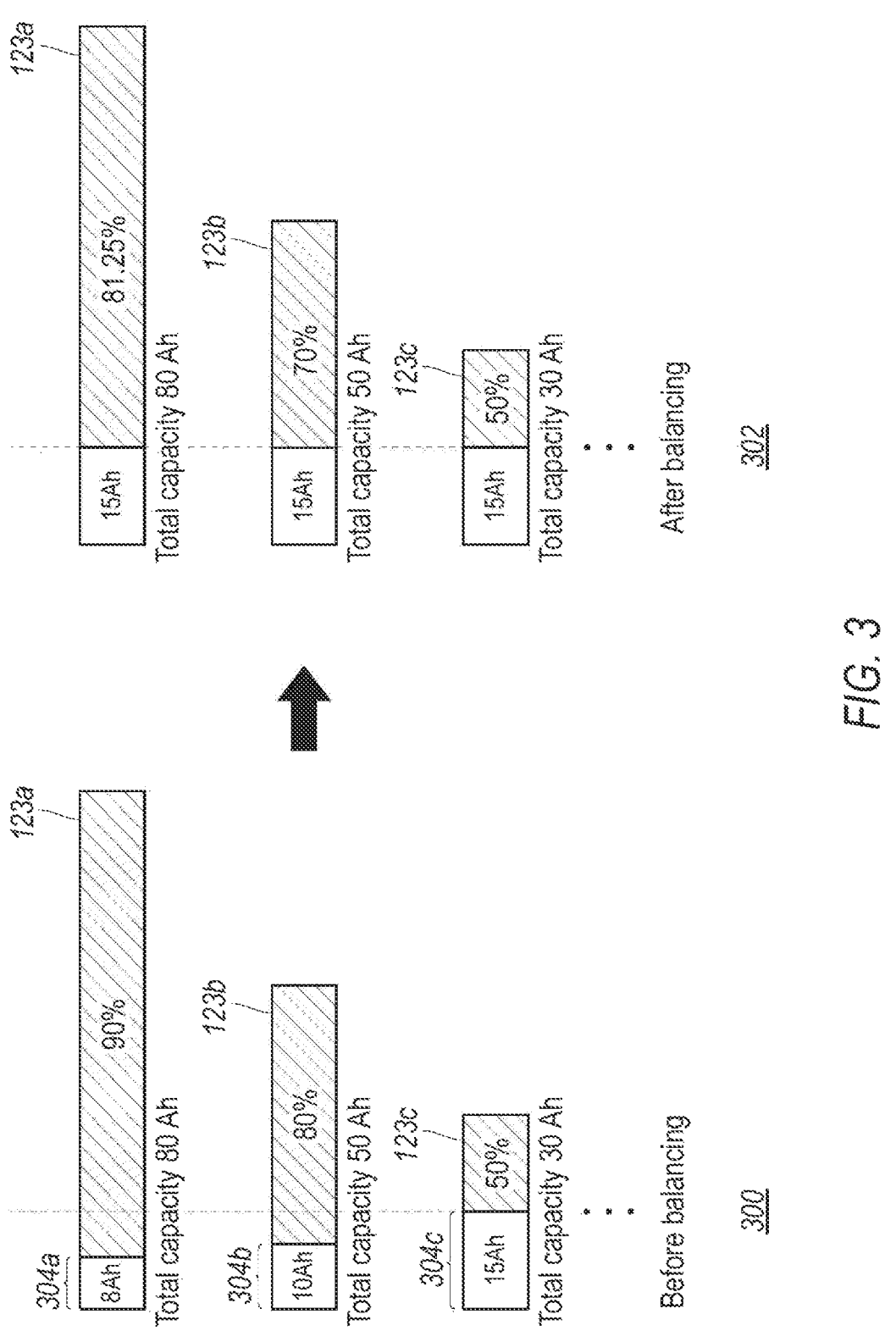
FIG. 3 illustrates a block diagram of a battery cell balancing process.

The operations of process 200 may be applied to various situations. Referring to FIG. 3, an example block diagram of an example battery cell balancing process is illustrated. The block diagram 300 illustrates the battery cell condition before the balancing process whereas the block diagram 302 illustrates the battery cell condition after the balancing process. With continuing reference to FIGS. 1 and 2, the traction battery 124 may include a plurality of cells 123. With reference to FIG. 3, a first cell 123a having a full charge capacity of 80 Ah, a second cell 123b having a full charge capacity of 50 Ah, and a third cell 123c having a full charge capacity of 30 Ah are illustrated. It is noted that although only three battery cells are illustrated, the present disclosure is not limited thereto and the traction battery 124 may include more or less cells due to the design needs. Since each battery cell 123 is connected in series, the maximum capacity of the battery pack 124 is limited to the cell having the lowest capacity. In the present example, since the third battery cell 123 has the lowest capacity of 30 Ah, the total capacity of the traction battery 124 is limited to 30 Ah. As further illustrated with reference to FIG. 3, the delivered charge 304 for the first, second and third cell 123*a*, 123*b*, 123*c* is 8 Ah, 10 Ah, and 15 Ah which results in 90%, 80% and 50% SOC for each of the first, second and third cell 123*a*, 123*b*, 123*c* respectively. The unbalanced delivered charged may be caused by various factors such as a temperature or age difference between the cells. If the traction battery 124 starts a charging event under such an unbalanced condition, the traction battery 124 may not be fully recharged as the charging event may finish when the cell having the lowest delivered charge is replenished (i.e. 8 Ah for the first cell 123*a*) leaving the second and third cells 123*b*, 123*c* not fully charged. The cell balancing process 200 as illustrated in FIG. 2 may be performed in this situation to match the delivered charge of all cells to the maximum delivered charge 304. In the present example, the BECM 125 may match the delivered charge 304 of the first and second battery cells 123*a*, 123*b* with the delivered charge 304 of the third battery cell 123*c*. The block diagram 302 illustrates the status of battery cells 123 after the balancing process 200 is complete. As can be seen, each battery cell 123 has the same delivered charge of 15 Ah which may facilitate the full recharge and even aging of all battery cells 123. That is, after charging the cells with a same current from a same period of time they may all reach a same or similar (e.g., within 10% of each other) state of charge value.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system for a vehicle comprising:
   a traction battery including a plurality of series connected cells; and
   a controller programmed to initiate discharging of at least some of the cells such that, upon completion of the discharging, states of charge of at least the some of the cells are different, and after charging the cells with a same current for a same period of time, the states of charge fall with a range of values.

2. The power system of claim 1, wherein after the charging, the states of charge have a same value.

3. The power system of claim 1, wherein the controller is further programmed to initiate the discharging based on data indicative of cell state of charge and cell capacity and, for each of the cells, a product of the capacity and a difference between a maximum state of charge value and a current value of the state of charge.

4. The power system of claim 3, wherein the controller is further programmed to initiate the discharging responsive to a difference between the product and a reference value being greater than a threshold value.

5. The power system of claim 4, wherein the reference value is a maximum of the products.

6. The power system of claim 3, wherein the controller is further programmed to, for each of the cells, stop the discharging responsive to a difference between the product and a reference value being less than a threshold value.

7. The power system of claim 6, wherein the reference value is a maximum of the products.

8. A method comprising:
   discharging at least some cells of a traction battery based on data indicative of cell state of charge and cell capacity such that, upon completion of the discharging, states of charge of at least some of the cells are different; and
   following the discharging, charging the cells for a same period of time such that at an end of the period of time, the states of charge fall with a predefined range of values.

9. The method of claim 8, wherein after the charging, the states of charge have a same value.

10. The method of claim 8, wherein the discharging is further based on, for each of the cells, a product of the capacity and a difference between a maximum state of charge value and a current value of the state of charge.

11. The method of claim 10 further comprising initiating the discharging responsive to a difference between the product and a reference value being greater than a threshold value.

12. The method of claim 11, wherein the reference value is a maximum of the products.

13. The method of claim 10 further comprising, for each of the cells, stopping the discharging responsive to a difference between the product and a reference value being less than a threshold value.

14. The method of claim 13, wherein the reference value is a maximum of the products.

* * * * *